United States Patent [19]

Vecchio

[11] 4,091,956
[45] May 30, 1978

[54] SPLATTER-PROOF LID

[76] Inventor: Fiore M. Vecchio, 9403- 118 Ave., Edmonton, Alberta, Canada, T5G 0N5

[21] Appl. No.: 808,455

[22] Filed: Jun. 21, 1977

[51] Int. Cl.² ............................................. B65D 51/16
[52] U.S. Cl. ..................... 220/231; 126/384; 220/369
[58] Field of Search ............... 220/231, 368, 369; 126/384, 299 C

[56] References Cited

U.S. PATENT DOCUMENTS

| 616,883 | 1/1899 | Bowers | 220/369 |
|---|---|---|---|
| 626,808 | 6/1899 | Gurney | 220/369 |
| 1,616,050 | 2/1927 | Kania | 220/368 |
| 2,219,498 | 10/1940 | Steyaert | 220/231 |
| 2,415,613 | 2/1947 | Sulak | 220/231 |
| 2,506,957 | 5/1950 | Gomez | 126/384 |
| 2,511,682 | 6/1950 | Allen | 220/368 |

Primary Examiner—George E. Lowrance
Attorney, Agent, or Firm—Sim & McBurney

[57] ABSTRACT

This invention provides a lid for a cooking pan having a central knob and two lid portions. The lid portions can be adjusted between a spaced-apart condition and a juxtaposed or surface-contact position. Each lid portion has apertures therethrough, but the apertures are not in alignment as viewed vertically. Thus, when the lid members are separated there are provided vent passages for cooking fumes, etc. to escape from a pan or pot being covered by the lid. Conversely, when the lid members are juxtaposed in surface-contact, the vent passages are closed, and escape of cooking fumes is restrained.

1 Claim, 5 Drawing Figures

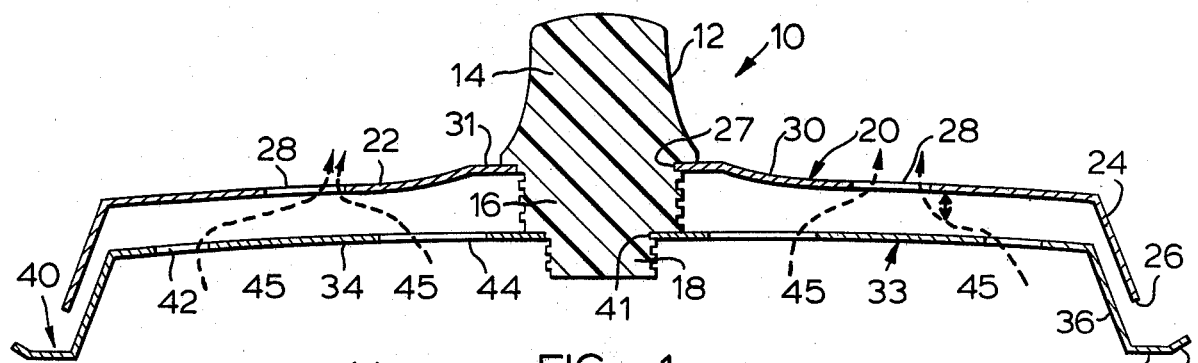
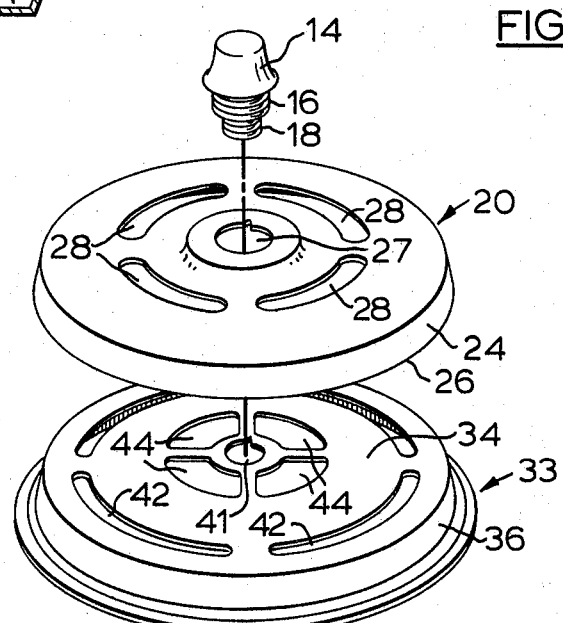
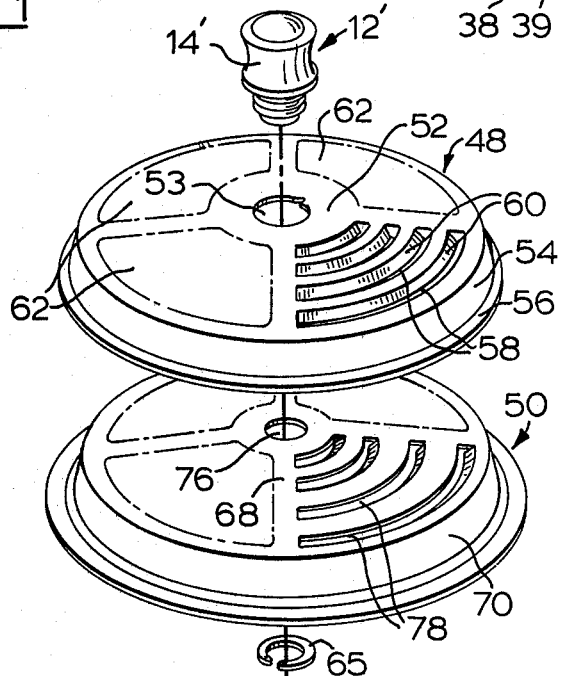
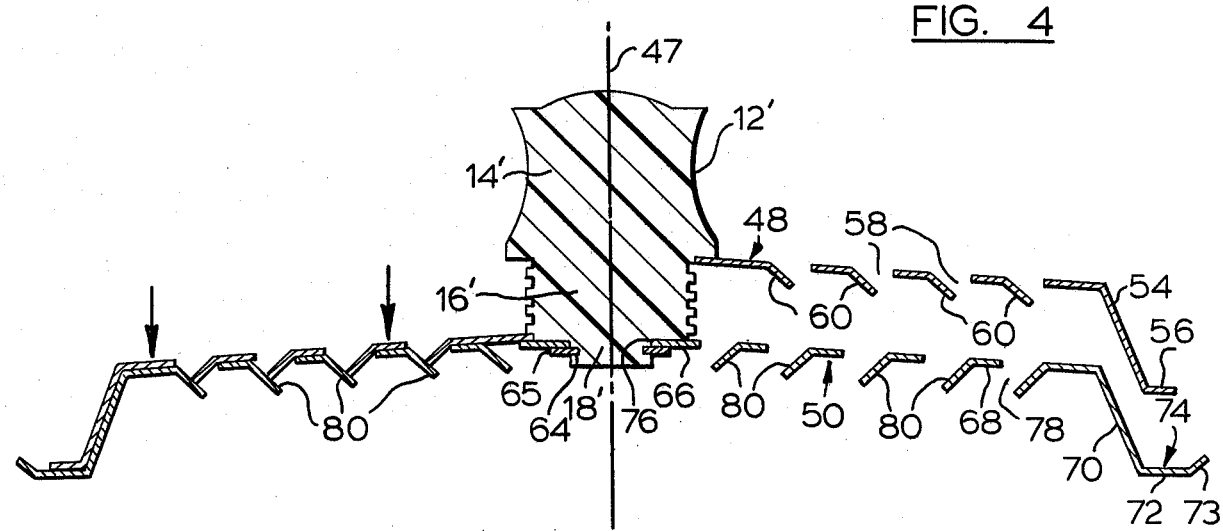

SPLATTER-PROOF LID

This invention relates generally to lids for cooking pans, and has to do particularly with a splatter-proof lid capable of two settings: one in which vent passages are provided to allow fumes from under the lid to pass to the exterior, and another in which the vent passages are closed.

It is an aspect of this invention to provide a simple construction for a splatter-proof lid having an open and a closed position, the construction being such as to be easily cleaned and readily adjustable between the open and closed positions.

Accordingly, this invention provides a lid for a cooking pan comprising:

a central member having a hand-grip knob on the upper end, a first externally threaded portion extending downwardly from the knob, and a second portion extending downwardly from the first portion, the diameter of the second portion being smaller than that of the first portion, an upper lid member having a main panel, an outer rim, a central opening in the main panel cut to define one helical thread for engagement with the first externally threaded portion of the central member, and a plurality of apertures in the main panel displaced from the central opening, and a lower lid member having a main panel, a central opening in the main panel adapted to receive the second portion of the central member, and a plurality of apertures in the main panel displaced from the central opening, the last-mentioned apertures being displaced from the first-mentioned apertures when the lid members are superimposed, and means for securing the lower lid member on the second portion, whereby the upper lid member can be rotated with respect to the knob to raise and lower it between a spaced position and a juxtaposed position vis-a-vis the lower lid member.

Three embodiments of this invention are illustrated in the accompanying drawings, in which like numerals denote like parts throughout the several views, and in which:

FIG. 1 is a vertical sectional view through a first embodiment of this invention;

FIG. 2 is an exploded perspective view of the first embodiment of this invention to a smaller scale;

FIG. 3 is a vertical sectional view of the second embodiment of this invention, showing the open position at right and the closed position at left;

FIG. 4 is an exploded perspective view of the second embodiment of this invention to a smaller scale.

Figure 5:
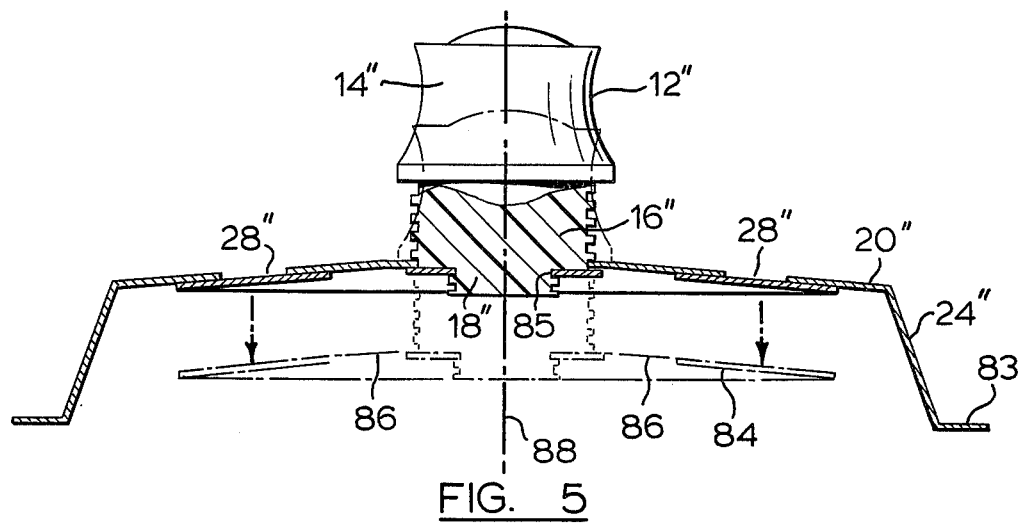
FIG. 5 is a view partly in section and partly in elevation of the third embodiment of this invention.

Attention is directly firstly to FIG. 1 in which a lid 10 for a cooking pan is seen to include a central member 12 which has a hand-grip knob 14 on the upper end, a first externally threaded portion 16 extending downwardly from the knob 14, and a second externally threaded portion 18 extending downwardly from the first portion 16. As can be seen in FIG. 1, the diameter of the second portion 18 is smaller than that of the first portion 16.

The lid 10 further incorporates an upper lid member 20 which has a main panel 22, an outer rim 24 which extends downwardly from the main panel 22 and terminates in a lower edge 26, and a central opening 27 cut to define one helical thread for engagement with the first externally threaded portion 16 of the central member 12. The shape of the metal defining the central opening 27 is best seen in FIG. 2. The upper lid member 20 also has a plurality of apertures 28 which are displaced radially outwardly from the central opening 27. More specifically, the apertures in the upper lid member are arcuate and concentric with the central opening 27. The main panel 22 of the upper lid member 20 has an upwardly and inwardly curling annular region 30 which adjoins a substantially planar portion 31 in which the central opening 27 is cut.

The lid 10 also includes a lower lid member 33 which has a main panel 34, an outer rim 36 which extends downwardly from the main panel and terminates in an outwardly projecting flange 38 which is upturned at the outer margin 39 to define a peripheral gutter 40 directly under the lower edge 26 of the upper lid member 20, so that drips from the lower edge 26 of the upper lid member 20 are caught in the peripheral gutter 40 of the lower lid member 33.

The lower lid member 33 has a central opening 41 which is cut to define one helical thread for engagement with the second externally threaded portion 18 of the central member 12, a set of arcuate apertures 42 equidistantly spaced from the central opening 41 toward the periphery of the main panel 34, and another set of apertures 44 disposed about the central opening 41 relatively close thereto.

When the lid members 20 and 33 are disposed as shown in FIG. 1, in which each lid member is screwed up to the uppermost limit of its respective externally threaded portion 16, 18, a gap exists between them which allows fumes and gases from under the lid to pass to the region above the lid along vent passages shown by the broken-line arrows 45. However, it is possible to unscrew the upper lid member 20 downwardly upon the first externally threaded portion 16 of the central member 12 so that the same comes downwardly against the lower lid member 33 in juxtaposed position thereagainst, thereby effectively closing the vent passages and preventing escape of cooking fumes and gases upwardly past the composite lid.

Thus, the user of the lid shown in FIGS. 1 and 2 can employ the same over a frying pan in which it is desired that fumes escape but also that spatter be contained. This would call for the open position as shown in FIG. 1. However, by closing the upper lid member 20 down against the lower lid membr 33, the lid of FIG. 1 could be used to cover saucepans in which food products are being boiled, and where it is desired to prevent the escape of steam from the boiling water.

Attention is now directed to FIGS. 3 and 4, showing the second embodiment of this invention. In FIG. 3 to the right of the mid-line 47 an upper lid member 48 and a lower lid member 50 are shown in separated or spaced position with respect to each other, whereas to the left of the mid-line 47 the members 48 and 50 are shown in collapsed or juxtaposed position.

The structure of the upper lid member 48 in FIGS. 3 and 4 is similar to that of the upper lid member 20 in FIG. 1 and includes a main panel 52, a central opening 53 cut to define one helical thread, and an outer rim 54 which extends downwardly from the main panel 52. However, the outer rim 54 in the case of the second embodiment terminates in an outwardly projecting flange 56.

The apertures provided in the main panel 52 of the upper lid member 48 of the second embodiment differ from those of the first embodiment in that they are provided as arcuate vents 58 concentric with the central opening 53, each vent having a downwardly and outwardly sloping louvre 60. The arcuate vents are provided in four concentric rings around the central opening 53, it being understood that the quadrants shown in broken lines at the numeral 62 in FIG. 4 have arcuate vents the same as those shown in solid lines in the remaining quadrant.

Turning to FIG. 3, it will be seen that the central member 12' includes a knob 14' at the upper end, a first portion 16' extending downwardly from the knob 14' and being externally threaded, and a second portion 18' extending downwardly from the first portion 16'. The diameter of the second portion 18' is smaller than that of the first portion 16'. In the case of the second embodiment of this invention, the second portion 18' is not externally threaded, but rather has an annular groove 64 adapted to receive a split ring 65. The split ring 65 retains the lower lid member 50 in place between itself and the lower surface 66 of the first downwardly extending portion 16' of the central member 12'.

The lower lid member 50 has a main panel 68, and an outer rim 70 which extends downwardly from the main panel 68 to terminate in an outwardly projecting flange 72 which is upturned at the outer margin 73 to define a peripheral gutter 74 directly under the flange 56 of the upper lid member 48, so that drips from the flange 56 are caught in the peripheral gutter 74.

The lower lid member 50 has a central opening 76 which is not cut to define a thread, since such is not needed. The central opening 76 is sized to receive snugly the second downwardly extending portion 18' of the central member 12', the portion 18' be substantially cylindrical.

The lower lid member 50 is provided with a plurality of apertures which are defined by arcuate vents 78 similar to the vents 58 in the upper lid member, the vents 78 being concentric with the central opening 76, and each having a downwardly and inwardly sloping louvre 80 extending from its outer edge, whereby when the lid members are juxtaposed as shown at the left in FIG. 3 the louvres of the vents in the upper and lower lid members interlock to prevent passage of fumes.

At the right in FIG. 3, in which the two lid members are spaced from each other, it is appreciated that vent passages are defined to allow cooking fumes and gases to pass from the region under the lid to the region over the lid.

Adjustment of the lid members in the embodiment shown in FIGS. 3 and 4 comes about by rotating the upper lid member 48 in the externally threaded portion 16'. The split ring attachment for the lower lid member 50 is required because, at the lower end of the rotating descent of the upper lid member 48, the downwardly extending louvers 60 would interfere with and catch upon parts of the lower lid member 50 if the latter were still in place as illustrated in FIG. 3.

Attention is now directed to FIG. 5, which shows the third embodiment of this invention. In FIG. 5, the central member 12" is substantially the same as that shown in FIG. 1, except for the particular configuration of the hand-grip knob 14". The central member 12" thus incorporates a first externally threaded portion 16" extending downwardly from the knob 14", and a second externally threaded portion 18" extending downwardly from the first portion 16". The diameter of the second portion 18" is smaller than that of the first portion 16".

The upper lid member 20" is similar to the corresponding member shown in FIG. 1, except that the outer rim 24" has, at the bottom, an outwardly extending flange 83.

The upper lid member 20" has arcuate apertures 28" where shown.

The lower lid member in the case of the third embodiment has a central opening 85 which is cut to define one helical thread, and which is adapted to be threaded tightly onto the second downwardly extending portion 18" of the central member 12". The lower lid member 84 is substantially a disc which is sized for reception within the upper lid member 20", although the lower lid member does have a slight curvature convex upwardly as can be seen in the figure. The lower lid member 84 includes arcuate apertures 86 which are spaced at a different radial distance from the mid-line 88, such that when the upper lid member 20" is unscrewed downwardly to the bottom of the portion 16", passage of cooking fumes and gases upwardly from the bottom to the top of the lid is prevented. Conversely, when the upper lid member 20" is at the top of the downwardly extending portion 16" (which is shown in broken lines in FIG. 5), it is possible for cooking fumes and the like to pass upwardly around the lower lid member 84 or through the apertures 86, and thence outwardly through the apertures 28" in the upper lid member 20".

It is to be understood that, in place of the threaded portions which form part of the central member 12, 12', 12", a bayonet-joint arrangement could be provided between one or both of the lid members and the central member. The user would then merely have to rotate one of the lid members partially in a particular direction in order to permit the lid member to move axially between the spaced configuration and the juxtaposed configuration.

I claim:

1. A lid for a cooking pan comprising:
a central member having a hand-grip knob on the upper end, a first externally threaded portion extending downwardly from the knob, and a second portion extending downwardly from the first portion, the diameter of the second portion being smaller than that of the first portion,
an upper lid member having a main panel, an outer rim, a central opening in the main panel cut to define one helical thread for engagement with the first externally threaded portion of the central member, and a plurality of apertures in the main panel displaced from the central opening,
and a lower lid member having a main panel, a central opening in the main panel adapted to receive the second portion of the central member, and a plurality of apertures in the main panel displaced from the central opening, the last-mentioned apertures being displaced from the first-mentioned apertures when the lid members are superimposed, and means for securing the lower lid member on the second portion,
whereby the upper lid member can be rotated with respect to the knob to raise and lower it between a spaced position and a juxtaposed position vis-a-vis the lower lid member,
the outer rim of the upper lid member extending downwardly from the main panel thereof and terminating in a peripheral edge, the lower lid member having an outer rim extending downwardly from the panel thereof and terminating in an outwardly projecting flange which is upturned at the outer margin to define a peripheral gutter directly under said peripheral edge so that drips from the lower edge are caught in the peripheral gutter, the said plurality of apertures in the upper lid member being defined by arcuate vents concentric with the central opening thereof, each vent having a downwardly and outwardly sloping louvre extending from its inner edge, the plurality of apertures in the lower lid member being defined by arcuate vents concentric with the central opening of the lower lid member, each vent of the lower lid member having a downwardly and inwardly sloping louvre extending from its outer edge, whereby when the lid members are juxtaposed the louvres of the vents in the upper and lower lid members can interlock in a V-shaped configuration to prevent passage of fumes.

* * * * *